United States Patent
Robison et al.

(10) Patent No.: US 10,148,669 B2
(45) Date of Patent: Dec. 4, 2018

(54) OUT-OF-BAND ENCRYPTION KEY MANAGEMENT SYSTEM

(71) Applicant: Dell Products L.P., Round Rock, TX (US)

(72) Inventors: Charles Robison, Buford, GA (US); Daniel Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 292 days.

(21) Appl. No.: 14/271,992

(22) Filed: May 7, 2014

(65) Prior Publication Data
US 2016/0119150 A1    Apr. 28, 2016

(51) Int. Cl.
*H04L 29/06* (2006.01)
*H04L 9/08* (2006.01)
*H04L 29/08* (2006.01)

(52) U.S. Cl.
CPC .......... *H04L 63/108* (2013.01); *H04L 9/0891* (2013.01); *H04L 63/062* (2013.01); *H04L 63/068* (2013.01); *H04L 67/10* (2013.01)

(58) Field of Classification Search
USPC ........................................................ 713/158
See application file for complete search history.

(56) References Cited

U.S. PATENT DOCUMENTS

| | | | |
|---|---|---|---|
| 7,200,868 B2 | 4/2007 | Mattox et al. | |
| 7,957,532 B2 * | 6/2011 | Chen | H04L 9/0822 380/270 |
| 8,429,081 B1 * | 4/2013 | Dronamraju | G06F 21/10 380/201 |
| 8,477,945 B2 * | 7/2013 | Falk | H04L 63/065 380/273 |
| 8,583,911 B1 | 11/2013 | Miller | |
| 8,588,422 B2 | 11/2013 | Beachem et al. | |

(Continued)

OTHER PUBLICATIONS

Key Server (Cryptographic)—Wikipedia, the free encyclopedia; "Key Server (Cryptographic)"; http://en.wikipedia.org/wiki/Key_server_(cryptographic).

(Continued)

*Primary Examiner* — Lisa C Lewis
*Assistant Examiner* — Thanh T Le
(74) *Attorney, Agent, or Firm* — Haynes and Boone, LLP

(57) ABSTRACT

An encryption key management system includes an encryption IHS that is coupled to a network. The encryption key management system also includes a host processing system. An off-host processing system in the encryption key management system is coupled to the host processing system and is coupled to the encryption IHS through the network. The off-host processing system provides an encryption key request to the encryption IHS through the network, receives an encryption key from the encryption IHS through the network and stores the encryption key, provides the encryption key to the host processing system in response to authenticating a user, and revokes the encryption key in response to a revocation instruction received from the encryption IHS through the network. The providing the request, and the receiving, providing, and revoking the encryption key may be performed by the off-host processing system while the host-processing system is not in an operating mode.

20 Claims, 3 Drawing Sheets

(56) References Cited

U.S. PATENT DOCUMENTS

| | | | | |
|---|---|---|---|---|
| 8,811,619 B2* | 8/2014 | Khatri | G06F 21/602 | 380/279 |
| 9,253,185 B2* | 2/2016 | Alaranta | H04L 63/062 | |
| 9,838,351 B2* | 12/2017 | Pujare | H04L 51/36 | |
| 2002/0073172 A1* | 6/2002 | Armstrong | H04N 7/17318 | 709/219 |
| 2002/0147924 A1* | 10/2002 | Flyntz | G06F 21/32 | 726/4 |
| 2003/0140257 A1* | 7/2003 | Peterka | F28F 13/02 | 726/12 |
| 2003/0212892 A1* | 11/2003 | Oishi | H04L 29/12009 | 713/168 |
| 2004/0015582 A1* | 1/2004 | Pruthi | H04L 41/142 | 709/224 |
| 2005/0027862 A1* | 2/2005 | Nguyen | G06F 9/505 | 709/225 |
| 2005/0154895 A1* | 7/2005 | Zhang | H04L 63/06 | 713/182 |
| 2007/0021843 A1* | 1/2007 | Neill | G06F 21/72 | 700/1 |
| 2007/0180515 A1* | 8/2007 | Danilak | G06F 21/602 | 726/16 |
| 2008/0022377 A1* | 1/2008 | Chen | H04L 63/062 | 726/5 |
| 2008/0065903 A1* | 3/2008 | Goodman | G06F 21/6218 | 713/193 |
| 2009/0034736 A1* | 2/2009 | French | H04L 63/062 | 380/278 |
| 2009/0103725 A1* | 4/2009 | Tang | G06Q 20/20 | 380/45 |
| 2009/0300356 A1* | 12/2009 | Crandell | G06F 21/32 | 713/170 |
| 2010/0177885 A1* | 7/2010 | Bates | G06F 21/6218 | 380/28 |
| 2010/0266132 A1* | 10/2010 | Bablani | H04L 9/0894 | 380/286 |
| 2011/0252238 A1* | 10/2011 | Abuan | H04L 61/2575 | 713/168 |
| 2011/0314279 A1* | 12/2011 | Ureche | H04L 9/3228 | 713/167 |
| 2012/0321087 A1* | 12/2012 | Fleischman | H04L 9/3213 | 380/279 |
| 2013/0125231 A1* | 5/2013 | Kuenzi | G06F 21/35 | 726/16 |
| 2014/0181290 A1* | 6/2014 | Wong | H04L 63/10 | 709/224 |
| 2014/0282846 A1* | 9/2014 | DeWeese | H04L 63/0428 | 726/1 |
| 2014/0331049 A1* | 11/2014 | Duby | H04L 63/08 | 713/171 |
| 2015/0200925 A1* | 7/2015 | Lagerstedt | H04L 63/062 | 726/6 |
| 2015/0263860 A1* | 9/2015 | Leboeuf | H04L 9/3226 | 713/171 |
| 2015/0318993 A1* | 11/2015 | Hamlin | H04L 63/0428 | 713/169 |
| 2015/0319171 A1* | 11/2015 | Robison | H04L 63/08 | 713/171 |

OTHER PUBLICATIONS

Secure Cryptoprocessor—Wikipedia, the free encyclopedia; "Secure Cryptoprocessor;" htto://en.wikipedia.org/wiki/Secure_crytoprocessor.

DFSMS Software Support for IBM System Storage TS1130 and TS1120 Tape Drives (3592); "Encryption Key Manager (EKM) for TS1120;" Sep. 2008; pp. 87-89; Fifth Edition; Chapter 14; International Business Machines Corporation (IBM Corp.); Poughkeepsie, New York.

\* cited by examiner

OUT-OF-BAND ENCRYPTION KEY MANAGEMENT SYSTEM

BACKGROUND

The present disclosure relates generally to information handling systems, and more particularly to an out-of-band encryption key management system for information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many IHSs include encrypted systems such as, for example, encrypted disk systems that operate to protect information on a disk drive by converting it into an unreadable code that cannot be deciphered easily by unauthorized persons. Such encrypted disk systems typically utilize disk encryption software or hardware to encrypt data that is sent to a disk or disk volume, and an encryption key is provided to authorized persons to allow them to decrypt data on the disk or disk volume such that that data may be read by the IHS. However, in conventional systems, such encryption keys are managed by a host processor on the IHS and, as such, may be exposed to theft by unauthorized persons who gain access to the host processor.

Accordingly, it would be desirable to provide an improved encryption key management system.

SUMMARY

According to one embodiment, an encryption key management system includes an encryption information handling system (IHS) that is coupled to a network; a host processing system; and an off-host processing system that is coupled to the host processing system and that is coupled to the encryption IHS through the network, wherein the off-host processing system is configured to: provide an encryption key request to the encryption IHS through the network; receive an encryption key from the encryption IHS through the network and store the encryption key; provide the encryption key to the host processing system in response to authenticating a user; and revoke the encryption key in response to a revocation instruction that is received from the encryption IHS through the network.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
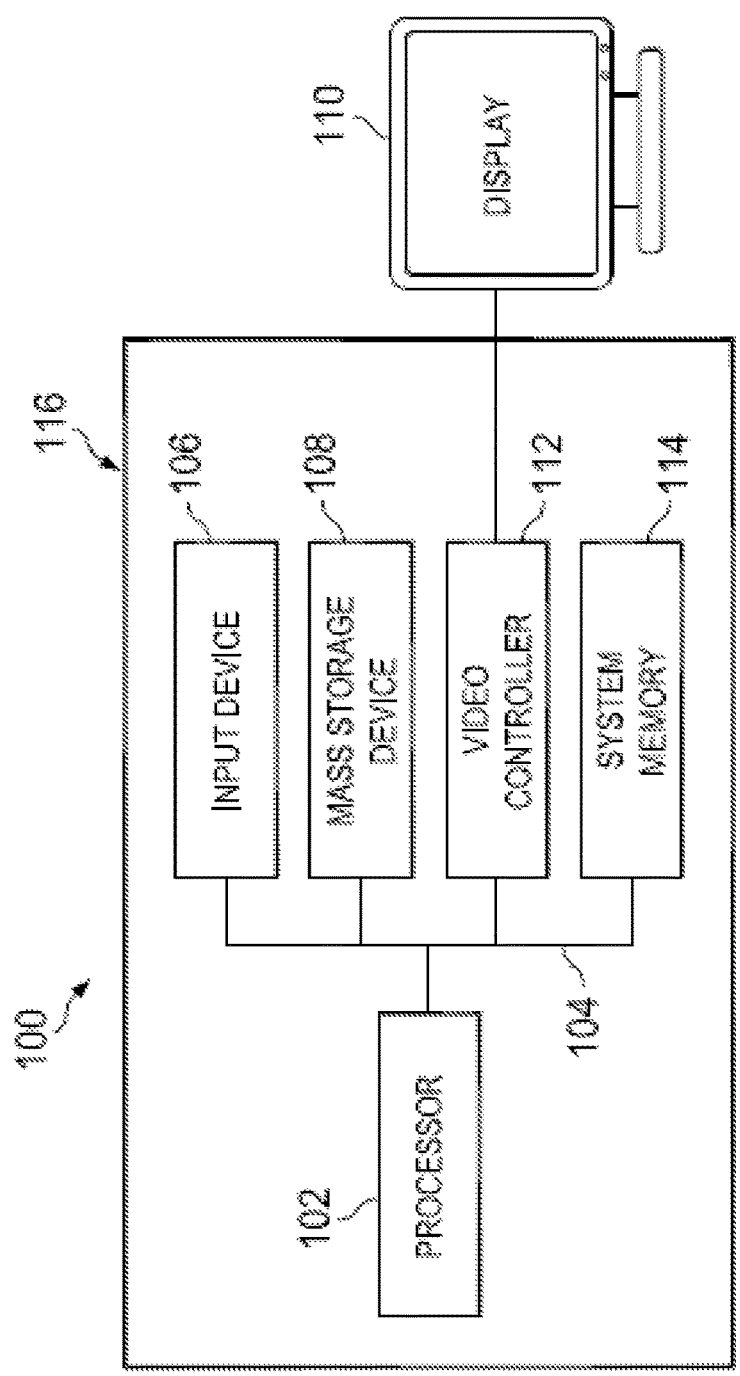
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
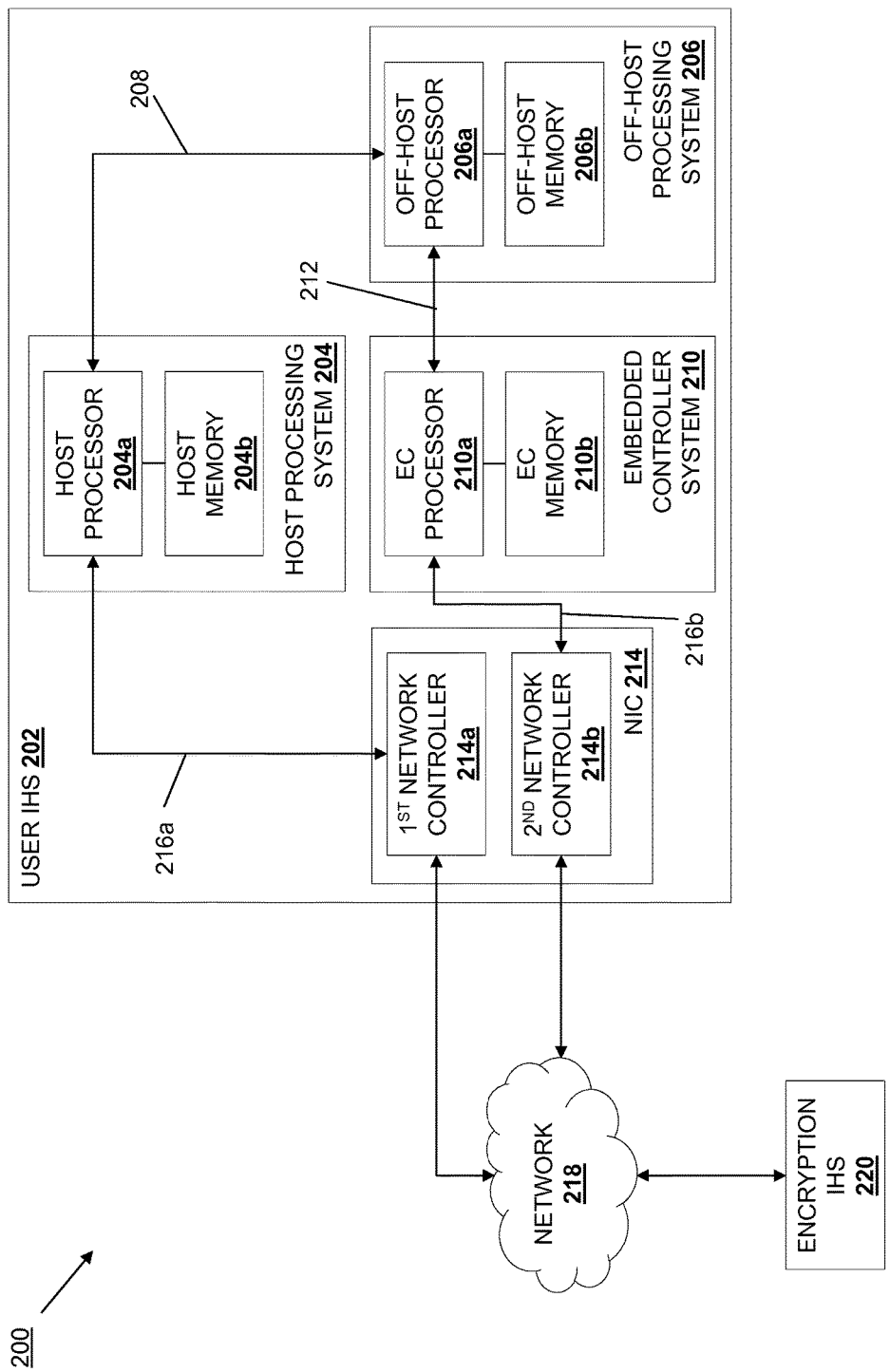
FIG. 2 is a schematic view illustrating an embodiment of an encryption key management system.

Referring now to FIG. 2, an embodiment of an out-of-band encryption key management system 200 is illustrated. The out-of-band encryption key management system 200 includes a user IHS 202 which may be the IHS 100 discussed above with reference to FIG. 1 and/or include some or all of the components of the IHS 100. For example, the user IHS may be a desktop IHS, a laptop/notebook IHS, a tablet IHS, a mobile phone IHS, and/or a variety of other IHS's known in the art. The user IHS 202 includes a host processing system 204 that includes a host processor 204a, a host memory 204b, and/or a variety of other host processing components known in the art. For example, the host processor 204a in the host processing system 204 may include the processor 102 discussed above with reference to FIG. 1, and the host memory 204b in the host processing system 204 may include the system memory 114 discussed above with reference to FIG. 1. However, one of skill in the art in possession of the present disclosure will recognize that the host processing system 204 in the out-of-band encryption key management system 200 may be a variety of processing systems utilized by a user IHS 202 to perform processing functions related to, for example, running an operating system, while remaining within the scope of the present disclosure.

The user IHS 202 also includes an off-host processing system 206 that includes an off-host processor 206a, an off-host memory 206b, and/or a variety of other off-host processing components known in the art. For example, the off-host processor 206a in the off-host processing system 206 may include a secure processor that is segregated, distinct from, and/or otherwise separate from the processor 102 in the IHS 100 discussed above with reference to FIG. 1, and the off-host memory 206b in the off-host processing system 206 may include a memory device that is segregated, distinct from, and/or otherwise separate from the system memory 114 in the IHS 100 discussed above with reference to FIG. 1 such that the off-host memory 206b is accessible by the off-host processor 206a but not the host processor 204a. However, one of skill in the art in possession of the present disclosure will recognize that the off-host processing system 206 in the out-of-band encryption key management system 200 may be a variety of off-host processing systems that may be utilized by a user IHS 202 to perform secure processing functions while remaining within the scope of the present disclosure. In the illustrated embodiment, the off-host processor 206a is coupled to the host processor 204a via a bus 208 such as, for example, a Universal Serial Bus (USB) connection. However, the bus 208 may be any variety of physical/logical bus connections that support encrypted communications, including but not limited to, the USB connection discussed above, a Thunderbolt interface, an Inter-Integrated Circuit (I2C), a Serial Peripheral Interface (SPI), a Peripheral Component Interface (PCI), and/or other bus connections known in the art that may communicate using, for example, Transport Layer Security (TLS) protocol, the Secure Sockets Layer (SSL protocol), the Hypertext Transfer Protocol Secure (HTTPS) protocol, and/or other communication protocols known in the art. In one example, the off-host processing system 206 may be provided, at least in part, using a ControlVault® system available from Dell, Inc. of Round Rock, Tex.

The user IHS 202 also includes an embedded controller system 210 that includes an embedded controller processor 210a, an embedded controller memory 210b, and/or a variety of other embedded controller components known in the art. For example, the embedded controller processor 210a in the embedded controller system 210 may include a processor, and the embedded controller memory 210b in the embedded controller system 210 may include a memory device that includes instructions that, when executed by the embedded controller processor 210a, cause the embedded controller processor 210a to perform the functions of the embedded controller system 210 discussed below. However, one of skill in the art in possession of the present disclosure will recognize that the embedded controller system 210 in the out-of-band encryption key management system 200 may be a variety of embedded controller systems that may be utilized by a user IHS 202 to perform embedded controller functions while remaining within the scope of the present disclosure. In the illustrated embodiment, the embedded controller processor 210a is coupled to the off-host processor 206a via a Low Pin Count (LPC) bus 212. However, the bus 212 may be any variety of physical/logical bus connections that support encrypted communications, including but not limited to, the LPC connection discussed above, a USB, a Thunderbolt interface, an I2C, an SPI, a PCI, and/or other bus connections known in the art.

The user IHS 202 also includes a network interface controller 214 that provides a first network controller 214a, a second network controller 214b, and/or that includes a variety of other network interface controller components known in the art. In some embodiments, the network interface controller 214 is compliant with Intel® Active Management Technology (AMT) and/or vPro technology. In an embodiment, the first network controller 214a in the network interface controller 214 may be segregated, distinct from, and/or otherwise separate from the second network controller 214b by assigning the first network controller 214a a first Media Access Control (MAC) address that is different from a second MAC address that is assigned to the second network controller 214b. However, one of skill in the art in possession of the present disclosure will recognize that the first network controller 214a and the second network controller 214b may be segregated from each other in a variety of manners (e.g., by providing the first network controller 214a on a different network interface controller than second network controller 214b, etc.) while remaining within the scope of the present disclosure.

In the illustrated embodiment, the host processor 204a in the host processing system 204 is coupled to the first network controller 214a in the network interface controller 214 via a bus 216a, and the embedded controller processor 210a in the embedded controller system 210 is coupled to the second network controller 214b in the network interface controller 214 via a bus 216b. In some embodiments, the buses 216a and 216b may be part of the same bus such as, for example, an I2C connection that connects the host processing system 204 and the embedded controller system 210 to the network interface controller 214. However, the bus 214 may be any variety of physical/logical bus connections that support encrypted communications, including but not limited to, the I2C discussed above, a USB, a Thunderbolt interface, an SPI, a PCI, and/or other bus connections known in the art. The host processor 204a may be configured to only have access to the first network controller 214a by providing the host processor 204a a first MAC address that is assigned to the first network controller 214a, while the embedded controller processor 210a may be configured to only have access to the second network controller 214b by providing the embedded controller processor 210a a second MAC address that is assigned to the second network controller 214b. However, as discussed above, the first network controller 214a and the second network controller 214b may be provided on different network interface controllers such that the busses 216a and 216b are physically separate buses while remaining within the scope of the present disclosure.

Figure 3:
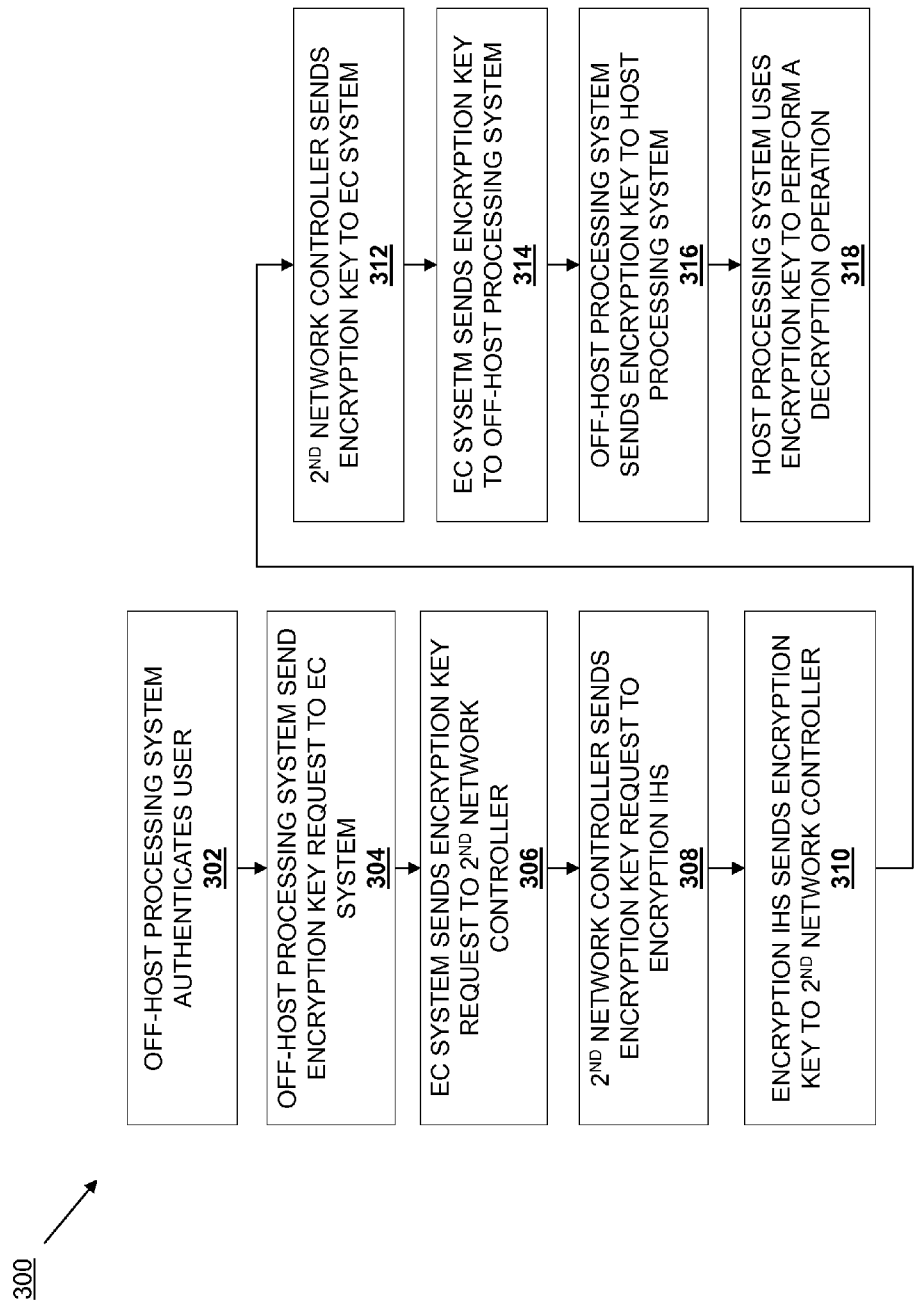
FIG. 3 is a flow chart illustrating an embodiment of a method for managing encryption keys.

Each of the first network controller 214a and the second network controller 214b are coupled to a network 218 such as, for example, a local area network (LAN), the Internet, and/or a variety of other networks known in the art. An encryption IHS 220 is also coupled to the network 218. In an embodiment, the encryption IHS 220 may be the IHS 100 discussed above with reference to FIG. 1 and/or may include some or all of the components of the IHS 100. For example, the encryption IHS 220 may be a server IHS or encryption server that operates to manage encryption keys for the out-of-band encryption key management system 200, discussed in further detail below. However, one of skill in the art in possession of the present disclosure will recognize that functionality of the encryption IHS 220 in the out-of-band encryption key management system 200 may be provided a variety of systems known in the art while remaining within the scope of the present disclosure Referring now to FIGS. 2 and 3, an embodiment of a method 300 for providing out-of-band encryption key management is illustrated. In the embodiments discussed below, the user IHS 202 in the out-of-band encryption key management system 200 includes one or more drives such as, for example, the storage devices 108 in the IHS 100 discussed above with reference to FIG. 1, that have been encrypted to protect information stored on those drives by encrypting that information to convert it into unreadable code. For example, the user or a system administrator may have previously (e.g., prior to the method 300) utilized disk encryption software or hardware to encrypt information that was sent to the drive(s) such that an encryption key must be used to decrypt the encrypted information on the drive so that information may be read by the user IHS and/or user. However, one of skill in the art in possession of the present disclosure will recognize that the out-of-band encryption key management system 200 will be beneficial for a variety of encryption systems other than drive encryption systems and thus its application to those other encryption systems is envisioned as falling within the scope of the present disclosure.

The method 300 begins at block 302 where a user is authenticated by the off-host processing system. In an embodiment of block 302, the off-host processor 206a in the off-host processing system 206 operates to authenticate a user of the user IHS 202. For example, a user of the user IHS 202 may power on, reset, and/or otherwise cause the user IHS 202 to boot such that the user IHS 202 requests user authentication credentials from the user (e.g., a username, a passcode, biometric information, and/or a variety of other authentication credentials known in the art). The user may then provide those authentication credentials using an authentication credential input device (e.g., the input device 106 discussed above with reference to FIG. 1). In some embodiments, any authentication credentials provided by the user are provided directly to the off-host processing system 206 through, for example, a direct connection between the authentication credential input device and the off-host processing system 206 (e.g., a bus connecting the authentication credential input device and the off-host processing system 206). For example, following a boot of the user IHS 202, control of the user IHS 202 may be passed to the off-host processing system 206 such that the off-host processing system 206 may request and receive authentication credentials from the user. In such embodiments, the host processing system 204 is not provided access to the authentication credentials due to the segregation of the host processor 204a and the off-host processor 206a.

However, in other embodiments, any authentication credentials provided by the user may be provided to the host processing system 204 through a connection between the authentication credential input device and the host processing system 204 (e.g., a bus connecting the authentication credential input device and the host processing system 204), and then forwarded by the host processing system 204 to the off-host processing system 206. For example, following a boot of the user IHS 202, the host processing system 204 may request and receive authentication credentials from the user, and then forward those authentication credentials to the off-host processing system 206 over the bus 208. In such embodiments, the host processing system 204 is provided access to the authentication credentials, but the host processing system 204 does not have any ability to determine whether the authentication credentials are associated with an authorized user, and rather only has the ability to forward those authentication credentials to the off-host processing system 206. At block 302, the off-host processor 206a in the off-host processing system 206 may operate to compare the authentication credentials received from the user to one or more stored authentication credentials in the off-host memory 206b to determine whether the authentication credentials received from the user are associated with an authorized user in the off-host memory 206b. In an embodiment, the user is authenticated by the off-host processor 206a in response to determining that the authentication credentials received from the user are associated with an authorized user in the off-host memory 206b.

The method 300 then proceeds to block 304 where the off-host processing system sends an encryption key request to the embedded controller system. In an embodiment, in response to authenticating the user at block 302, the off-host processor 206a operates to generate and send an encryption key request over the bus 212 to the embedded controller processor 210a in the embedded controller system 210. In an embodiment, the encryption key request send by the off-host processor 206a at block 204 may include information about the authenticated user (e.g., a user identifier such as an employee ID), information about the user IHS 202 (e.g., a user IHS identifier such as an IP address), and/or a variety of other encryption key request information known in the art. The host processing system 204 is not involved in, and is not needed for, any portion of block 304 of the method 300 and, as such, block 304 of the method 300 may be performed by the off-host processing system 206 and the embedded controller system 210 while the host processing system 204 is in a reduced power and/or non-operating mode. One of skill in the art in possession of the present disclosure will recognize that in this example of the method 300, the authenticated user has not previously been associated with an encryption key in the off-host memory 206b and thus an encryption key request must be provided at block 304 in order to retrieve an encryption key and associate that encryption key with the authenticated user such that the user IHS 202 may use that encryption key to decrypt encrypted information for the authenticated user. However, as discussed below, at block 304 the off-host processor 206a may determine whether a valid encryption key is associated with the authenticated user in the off-host memory 206b (i.e., as a result of a previous performance of the method 300).

The method 300 then proceeds to block 306 where the embedded controller system sends the encryption key request to the second network controller. In an embodiment, the embedded controller processor 210a operates at block 306 to send the encryption key request that was received from the off-host processor 206a over the bus 216b to the second network controller 214b in the network interface controller 214. For example, the embedded controller processor 210a my use the second MAC address assigned to the second network controller 214b to send the encryption key request to the second network controller 214b. As discussed above, the first network controller 214a in the network interface controller 214 may be segregated, distinct from, and/or otherwise separate from the second network controller 214b by assigning the first network controller 214a a first MAC address that is different from a second MAC address that is assigned to the second network controller 214b and, as such, any control of the host processing system 204 (e.g., by an unauthorized user) will not result in access to the encryption key request (i.e., because the host processing system 204 does not have access to the second network controller 214*b*). Furthermore, the host processing system 204 is not involved in, and is not needed for, any portion of block 306 of the method 300 and, as such, block 306 of the method 300 may be performed by the embedded controller system 210 and the second network controller 214*b* while the host processing system 204 is in a reduced power and/or non-operating mode.

The method 300 then proceeds to block 308 where the second network controller sends the encryption key request to the encryption IHS. In an embodiment, the second network controller 214*b* operates at block 308 to send the encryption key request received from the embedded controller processor 210*a* over the network 218 to the encryption IHS 220. In an embodiment, the second network controller 214*b* may have access to the encryption IHS 220 over the network 218 that is not provided to the first network controller 214*a*, and at block 308 may use that access to send the encryption key request to the encryption IHS 220. In such embodiments, the restriction of access to the encryption IHS 220 to the second network controller 214*b* prevents any control of the host processing system 204 (e.g., by an unauthorized user) from resulting in access to the encryption IHS (i.e., because the host processing system 204 only has access to the first network controller 214*a*). Furthermore, the host processing system 204 is not involved in, and is not needed for, any portion of block 308 of the method 300 and, as such, block 308 of the method 300 may be performed by the second network controller while the host processing system 204 is in a reduced power and/or non-operating mode.

The method 300 then proceeds to block 310 where the encryption IHS sends an encryption key to the second network controller. In an embodiment, the encryption IHS 220 operates at block 310 to receive the encryption key request, verify the encryption key request, generate, allocate, and/or otherwise retrieve an encryption key for the authenticated user or user IHS, and send the encryption key to the second network controller 214*b*. For example, the encryption IHS 220 may use the received encryption key request (e.g., the encryption key request information in the encryption key request that was received at block 308) to determine (e.g., by checking a database) whether an authenticated user associated with the encryption key request is authorized to receive an encryption key, to determine a level of authorization the authenticated user is designated, and/or to determine a variety of other authorization characteristics known in the art. The encryption IHS 220 may then generate, allocate, and/or otherwise retrieve an encryption key for the authenticated user, or generate, allocate, and/or otherwise retrieve an encryption key that is appropriate for the level of authorization determined for the authenticated user, and send that encryption key over the network 218 to the second network controller 214*b*. As discussed above, the first network controller 214*a* in the network interface controller 214 may be segregated, distinct from, and/or otherwise separate from the second network controller 214*b* by assigning the first network controller 214*a* a first MAC address that is different from a second MAC address that is assigned to the second network controller 214*b* and, as such, any control of the host processing system 204 (e.g., by an unauthorized user) will not result in access to the encryption key (i.e., because the host processing system 204 does not have access to the second network controller 214*b*). Furthermore, the host processing system 204 is not involved in, and is not needed for, any portion of block 310 of the method 300 and, as such, block 310 of the method 300 may be performed by the second network controller while the host processing system 204 is in a reduced power and/or non-operating mode.

The method 300 then proceeds to block 312 where the second network controller sends the encryption key to the embedded controller system. In an embodiment, the second network controller 214*b* operates at block 312 to send the encryption key received from the encryption IHS 220 over the bus 216*b* to the embedded controller processor 210*a* in the embedded controller system 210. As discussed above, the first network controller 214*a* in the network interface controller 214 may be segregated, distinct from, and/or otherwise separate from the second network controller 214*b* by assigning the first network controller 214*a* a first MAC address that is different from a second MAC address that is assigned to the second network controller 214*b* and, as such, any control of the host processing system 204 (e.g., by an unauthorized user) will not result in access to the encryption key (i.e., because the host processing system 204 does not have access to the second network controller 214*b*). Furthermore, the host processing system 204 is not involved in, and is not needed for, any portion of block 312 of the method 300 and, as such, block 312 of the method 300 may be performed by the second network controller 214*b* and the embedded controller system 210 while the host processing system 204 is in a reduced power and/or non-operating mode.

The method 300 then proceeds to block 314 where the embedded controller system sends the encryption key to the off-host processing system. In an embodiment, the embedded controller processor 210*a* operates at block 314 to send the encryption key received from the second network controller 214*b* over the bus 212 to the off-host processor 206*a* in the off-host processing system 206. In some embodiments of block 314, the off-host processor 206*a* may receive the encryption key from the embedded controller processor 210*a* and store that encryption key in the off-host memory 206*b* in association with the authenticated user for whom the encryption key request was sent at block 304. As discussed above, the host processor 204*a* in the host processing system 204 may be segregated, distinct from, and/or otherwise separate from the off-host processing system 206 and, as such, any control of the host processing system 204 (e.g., by an unauthorized user) will not result in access to the encryption key that was stored in the off-host memory 206*a*. Furthermore, the host processing system 204 is not involved in, and is not needed for, any portion of block 314 of the method 300 and, as such, block 314 of the method 300 may be performed by the embedded controller system 210 and the off-host processing system 206 while the host processing system 204 is in a reduced power and/or non-operating mode.

The method 300 then proceeds to block 316 where the off-host processing system sends the encryption key to the host processing system. In an embodiment, the off-host processor 206*a* operates at block 316 to send the encryption key that is associated in the off-host memory 206*b* with the authenticated user over the bus 208 to the host processor 204*a* in the host processing system 204. As such, in response to receiving authentication credentials from a user and authenticating those authentication credentials, the off-host processing system 206 operates to retrieve an encryption key from the encryption IHS 220 in a manner that is independent of host processing system 204, and provide that encryption key to the host processing system 204. In some embodiments, the host processing system 204 may temporarily store the encryption key in the host memory 204b. For example, the host processing system 204 may store the encryption key in the host memory 204b for a predetermined amount of time, until the user IHS is reboot or reset, until the authenticated user logs out of the user IHS, and/or in a variety of other manners known in the art. However, in other embodiments, the host processing system 204 may not store the encryption key for any significant period of time, but rather may request the encryption key, receive the encryption key, use the encryption key, and discard the encryption key each time a decryption operation must be performed.

The method 300 then proceeds to block 318 where the host processing system uses the encryption key to perform one or more decryption operations. In some embodiments, the host processor 204a may operate at block 318 to retrieve the encryption key from the host memory 204b and use it to decrypt encrypted information on a drive. In some embodiments, the host processor 204a may operate at block 318 to use the encryption key received at block 316 to decrypt encrypted information on a drive and then erase that encryption key without storing it in the host memory 204b. While a few examples have been provided, one of skill in the art in possession of the present disclosure will recognize that any of a variety of uses of the encryption keys managed using the method 300 will fall within the scope of the present disclosure.

Following the performance of the method 300, the user that was authenticated at block 302 may be able to use the encryption key that was provided to the off-host processing system at block 316 for use in decryption operations on the user IHS 202. Such use may be restricted to a limited time, to a single user IHS session, or across any number of user IHS sessions. As discussed above, the host processing system 204 may be provided limited or extended access to the encryption key for decryption operations, but management of that encryption key is performed by the off-host processing system 206 and the encryption IHS 220. For example, the off-host processor 206a may operate to destroy the encryption key or segregate the encryption key (e.g., disassociate the encryption key from the authenticated user or user IHS in the off-host memory 206b) after any of the predetermined times or predetermined actions discussed above. Furthermore, the encryption IHS 220 may operate to communicate with off-host processing systems in user IHSs to cause encryption keys to be destroyed, segregated, or otherwise revoked from a user or user IHS. For example, following the method 300, the encryption IHS 220 may be used to send a revocation instruction over the network 218 to the off-host processor 206a in the off-host processing system 206 (e.g., via the second network controller 214b and the embedded controller system 210) that causes the off-host processor 206a to revoke the encryption key that was sent to the host processing system at block 316 by deleting that encryption key from the off-host memory 206b, disassociating the authenticated user or user IHS from the encryption key in the off-host memory 206b, and/or by performing a variety of other revocation operations known in the art. Furthermore, because the management of the encryption key is performed by the off-host processing system 206 and the encryption IHS 220, revocation of encryption keys may be performed while the host processing system 204 is in a reduced power and/or non-operating mode.

Thus, out-of-band encryption key management systems and methods have been described that provide for the management of encryption keys that are used by a host processing system in a user IHS for decryption operations. The systems and methods provided herein use an encryption IHS that is connected to the user IHS through a network, along an off-host processing system in the user IHS, to manage encryption keys in a manner that is independent of the host processing system and that prevents access by the host processing system to valid encryption keys (and the information used to retrieve them) unless those encryption keys are provided directly by the off-host processing system. The off-host processing system and the encryption IHS may operate to update and/or revoke any encryption key provided to the host processing system for use by a user or user IHS at any time, including when the host processing system is not in an operational mode.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An encryption key management system, comprising:
an encryption information handling system (IHS) that is coupled to a network;
a user IHS that is coupled to the network and that includes a user IHS chassis that houses:
  a network interface controller that includes a first network controller that is coupled to the network and a second network controller that is coupled to the network;
  a host processing system that includes a host processor and a host memory that is coupled to the host processor, wherein the host processing system is coupled to the network via the first network controller such that the host processing system only has access to the network through the first network controller; and
  an off-host processing system that includes an off-host processor and an off-host memory that is coupled to the off-host processor and that is not accessible by the host processor, wherein the off-host processing system is coupled to the host processing system via a bus, and coupled to the encryption IHS through the network via the second network controller such that the off-host processing system only has access to the network through the second network controller, and wherein the first network controller and the second network controller allow the host processing system and the off-host processing system to access the network at the same time when the host processing system is operational, and wherein the off-host processing system is configured to:
    provide an encryption key request to the encryption IHS through the network;
    receive an encryption key from the encryption IHS through the network and store the encryption key in the off-host memory such that the encryption key is not accessible by the host processor;
    provide the encryption key to the host processing system over the bus in response to authenticating a user such that the encryption key is accessible by the host processor; and
    revoke the encryption key in response to a revocation instruction that is received from the encryption IHS through the network.

2. The system of claim 1, wherein the second network controller is configured to forward the encryption key request from the off-host processing system to the encryption IHS, and wherein the second network controller is configured to forward the encryption key from the encryption IHS to the off-host processing system.

3. The system of claim 2, wherein the user IHS chassis further houses:
an embedded controller system that couples the off-host processing system to the second network controller, wherein the embedded controller system is configured to forward the encryption key request from the off-host processing system to the second network controller, and wherein the embedded controller system is configured to forward the encryption key from the second network controller to the off-host processing system.

4. The system of claim 1, wherein the providing the encryption key request, receiving the encryption key, providing the encryption key, and revoking the encryption key are performed by the off-host processing system while the host processing system is not in an operating mode.

5. The system of claim 1, wherein the encryption IHS is configured, without a request from the off-host processing system, to update one or more encryption keys on the off-host processing system while the host processing system is not in an operating mode.

6. The system of claim 1, wherein the host processing system is configured to use the encryption key to decrypt encrypted information on a storage device.

7. The system of claim 1, wherein the host processing system and the off-host processing system are each located in a user IHS chassis.

8. An information handling system (IHS), comprising:
an IHS chassis that houses:
    a network interface controller that includes a first network controller that is coupled to the network and a second network controller that is coupled to the network;
    an IHS host processing system that includes a host processor and a host memory that is coupled to the host processor, wherein the host processor is coupled to the network via the first network controller such that the host processing system only has access to the network through the first network controller; and
    an off-host processing system that includes an off-host processor and an off-host memory that is coupled to the off-host processor and that is not accessible by the host processor, wherein the off-host processing system is coupled to the IHS host processing system via a bus, and coupled to the network via the second network controller such that the off-host processor only has access to the network through the second network controller, and wherein the first network controller and the second network controller allow the IHS host processing system and the off-host processing system to access the network at the same time when the IHS host processing system is operational, and wherein the off-host processing system is configured to:
        provide an encryption key request through the second network controller to an encryption IHS;
        receive an encryption key from the encryption IHS through the second network controller and store the encryption key in the off-host memory such that the encryption key is not accessible by the host processor;
        provide the encryption key to the IHS host processing system via the bus in response to authenticating a user such that the encryption key is accessible by the host processor; and
        revoke the encryption key in response to a revocation instruction that is received through the second network controller from the encryption IHS.

9. The IHS of claim 8, wherein the IHS chassis further houses:
an embedded controller system that couples the off-host processing system to the second network controller, wherein the embedded controller system is configured to forward the encryption key request from the off-host processing system to the second network controller, and wherein the embedded controller system is configured to forward the encryption key from the second network controller to the off-host processing system.

10. The IHS of claim 8, wherein the providing the encryption key request, receiving the encryption key, providing the encryption key, and revoking the encryption key are performed by the off-host processing system while the IHS host processing system is not in an operating mode.

11. The IHS of claim 8, wherein
the encryption IHS is coupled through the network to the first network controller and the second network controller.

12. The IHS of claim 8, wherein the encryption IHS is configured, without a request from the off-host processing system, to update one or more encryption keys on the off-host processing system while the IHS host processing system is not in an operating mode.

13. The IHS of claim 8, further comprising:
a storage device coupled to the IHS host processing system, wherein the IHS host processing system is configured to use the encryption key to decrypt encrypted information on the storage device.

14. The IHS of claim 8, further comprising:
an IHS chassis, wherein the IHS host processing system and the off-host processing system are each located in an IHS chassis.

15. A method for managing encryption keys, comprising:
providing, by an off-host processing system in a computing device, an encryption key request to an encryption IHS through a network, wherein the computing device includes a computing device chassis that houses:
    (1) a host processing system with a host processor;
    (2) a first network controller that provides the only access to the network for the host processor;
    (3) a host memory that is coupled to the host processor;
    (4) the off-host processing system with an off-host processor;
    (5) a second network controller that provides the only access to the network for the off-host processor, wherein the first network controller and the second network controller allow the host processor and the off-host processor to access the network at the same time when the host processor is operational; and
    (6) an off-host memory that is coupled to the off-host processor and not accessible by the host processor;
receiving, by the off-host processing system, an encryption key from the encryption IHS through the network via the second network controller and storing the encryption key in the off-host memory such that the encryption key is not accessible by the host processor;
providing, by the off-host processing system, the encryption key to a host processing system via the bus in response to authenticating a user such that the encryption key is accessible by the host processor; and revoking, by the off-host processing system, the encryption key in response to a revocation instruction that is received from the encryption IHS through the network.

16. The method of claim 15, further comprising:

forwarding, by the second network controller that couples the off-host processing system to the network, the encryption key request from the off-host processing system to the encryption IHS; and forwarding, by the second network controller, the encryption key from the encryption IHS to the off-host processing system.

17. The method of claim 16, further comprising:

forwarding, by an embedded controller system that is housed in the computer device chassis and that couples the off-host processing system to the second network controller, the encryption key request from the off-host processing system to the second network controller; and forwarding, by the embedded controller system, the encryption key from the second network controller to the off-host processing system.

18. The method of claim 15, wherein the providing the encryption key request, receiving the encryption key, providing the encryption key, and revoking the encryption key are performed by the off-host processing system while the host processing system is not in an operating mode.

19. The method of claim 15, further comprising:

updating, by the encryption IHS without receiving a request from the off-host processing system, one or more encryption keys on the off-host processing system while the host processing system is not in an operating mode.

20. The method of claim 15, further comprising:

decrypting, by the host processing system using the encryption key, encrypted information on a storage device.

* * * * *